United States Patent [19]

Lenoski

[11] Patent Number: 4,899,307

[45] Date of Patent: Feb. 6, 1990

[54] STACK WITH UNARY ENCODED STACK POINTER

[75] Inventor: Daniel E. Lenoski, Mountain View, Calif.

[73] Assignee: Tandem Computers Incorporated, Cupertino, Calif.

[21] Appl. No.: 36,607

[22] Filed: Apr. 10, 1987

[51] Int. Cl.[4] ............................................. G11C 13/00
[52] U.S. Cl. ..................................... 365/78; 365/231; 365/240
[58] Field of Search ...................... 365/189, 78, 81, 94, 365/231, 240

[56] References Cited

U.S. PATENT DOCUMENTS

| | | |
|---|---|---|
| 3,396,371 | 9/1964 | Waldecker . |
| 3,431,434 | 10/1967 | Barton et al. . |
| 3,699,528 | 10/1972 | Carlson et al. . |
| 3,722,658 | 11/1973 | Sarlo . |
| 3,763,480 | 10/1973 | Weimer . |
| 3,868,644 | 2/1975 | Healey et al. . |
| 3,924,245 | 12/1975 | Eaton et al. . |
| 3,942,163 | 3/1976 | Goyal . |
| 3,975,717 | 8/1976 | Panigrahi ............................ 365/183 |
| 4,138,732 | 2/1979 | Suzuki et al. ........................ 364/200 |
| 4,152,778 | 5/1979 | Nissen et al. ......................... 365/94 |
| 4,176,394 | 11/1979 | Kaminski et al. . |
| 4,228,497 | 10/1980 | Gupta et al. ......................... 364/200 |
| 4,314,361 | 2/1982 | Jansen et al. ......................... 365/78 |
| 4,375,678 | 3/1983 | Krebs, Jr. ............................. 365/238 |
| 4,433,394 | 2/1984 | Torii et al. ............................ 365/78 |
| 4,504,925 | 3/1985 | Gilhousen ........................... 364/900 |
| 4,592,019 | 5/1986 | Huang et al. . |
| 4,660,217 | 4/1987 | Yamada ............................... 365/78 |
| 4,733,376 | 3/1988 | Ogawa ................................. 365/78 |
| 4,751,675 | 7/1988 | Knauer ................................ 365/78 |

Primary Examiner—Terrell W. Fears
Attorney, Agent, or Firm—Townsend and Townsend

[57] ABSTRACT

A stack with a unary encoded stack pointer which uses the position of a single bit to point to the top of the stack. A number of multi-bit latches are used to store the data elements in the stack. A serial, bidirectional shift register is loaded with all digital zeros except for a position having a digital one (the pointer) which is coupled to the register containing the top of the stack. As new data elements are pushed onto or popped off of the top of the stack, the pointer is shifted right or left accordingly.

7 Claims, 4 Drawing Sheets

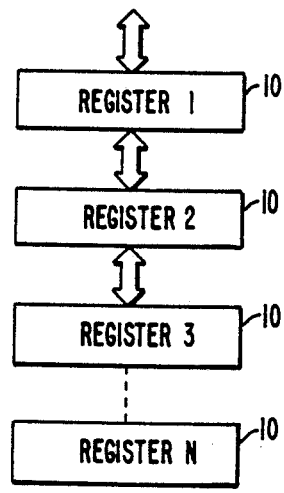
FIG._1.  PRIOR ART
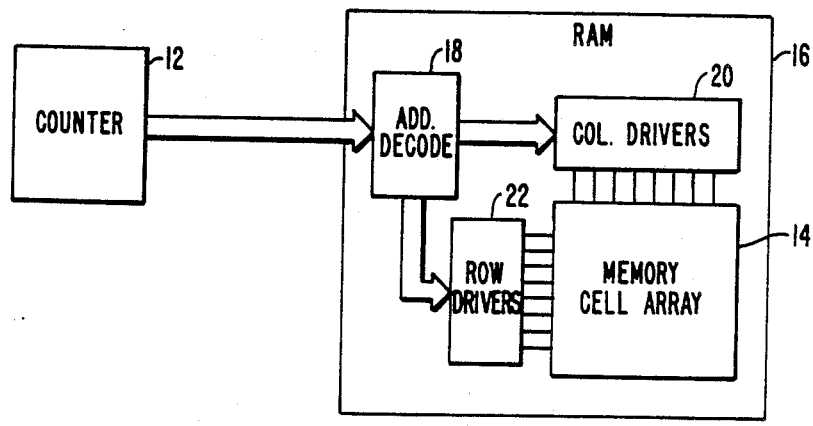
FIG._2.  PRIOR ART

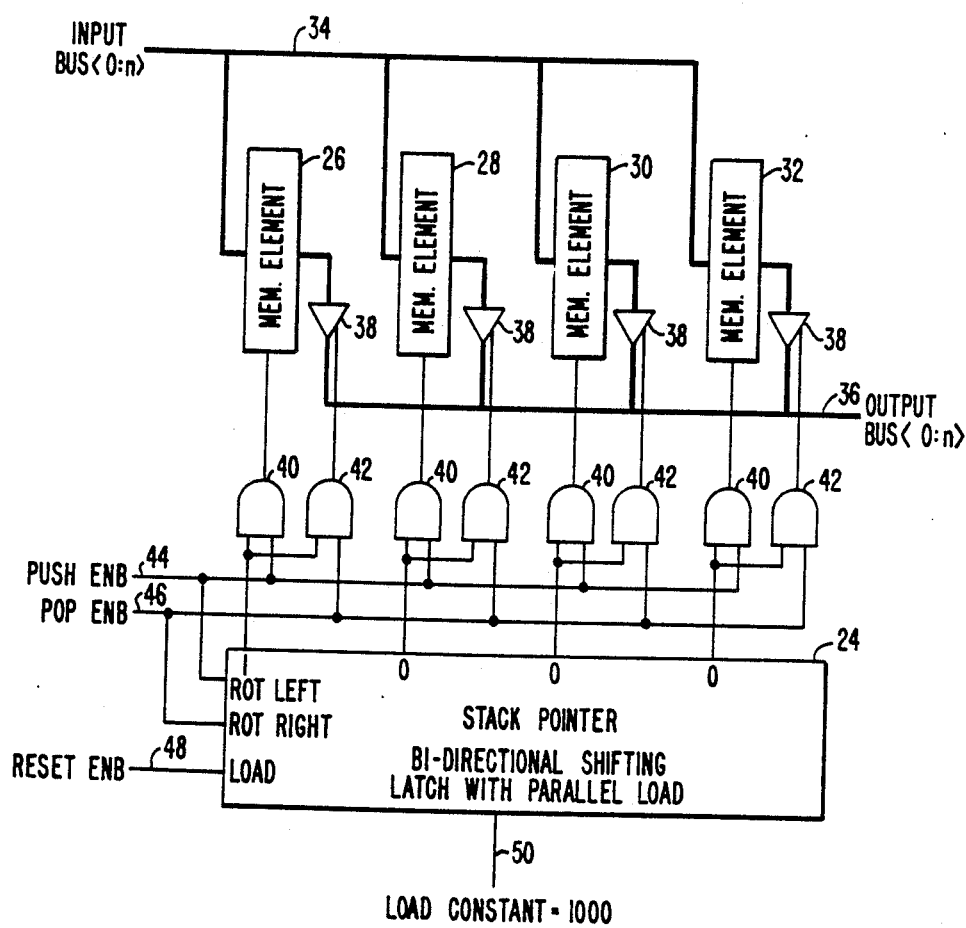
FIG._3.

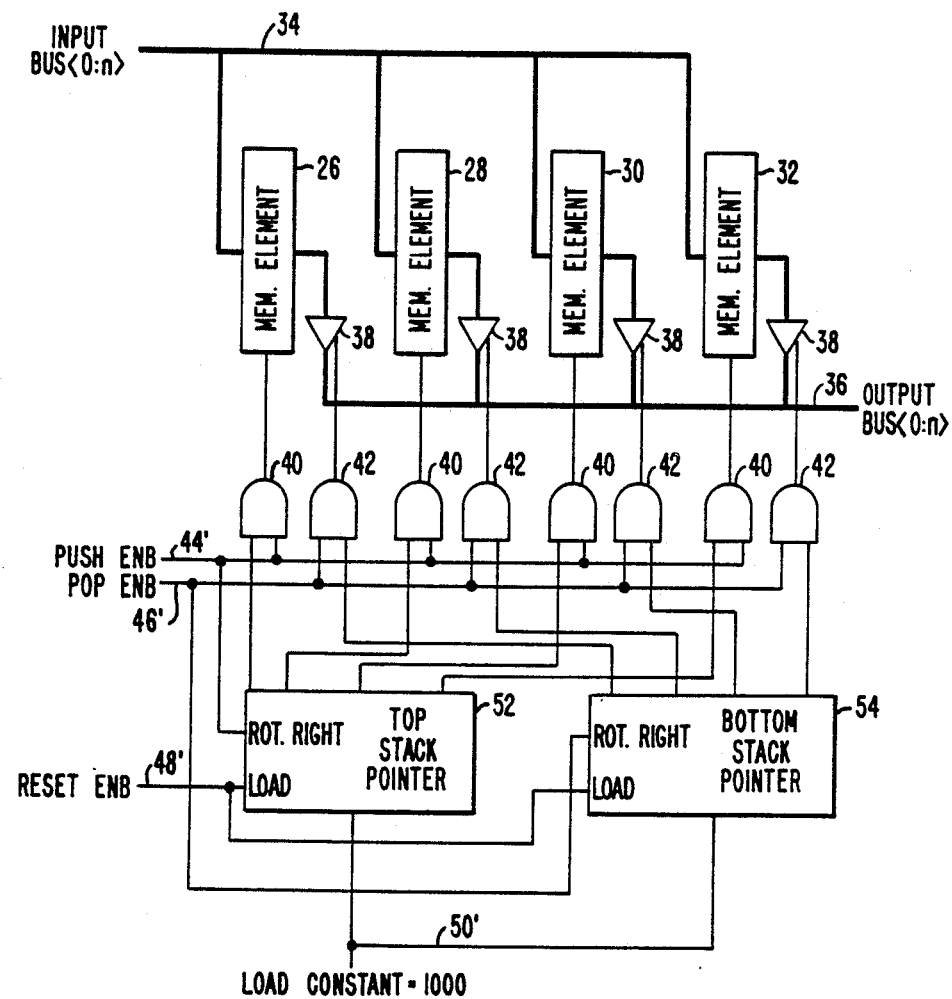
FIG._4.

STACK WITH UNARY ENCODED STACK POINTER

BACKGROUND

The present invention relates to memory stacks for storing data in either a last-in-first-out (LIFO) or first-in-first-out (FIFO) arrangement.

There are two primary types of stacks used today. In a first type of stack, shown in FIG. 1, a series of registers are used to store the data elements, with the data element in each register being shifted downward into the next register when a new data element is added to the stack. When the last added data element is removed from the stack in a LIFO arrangement, each data element is moved upward into the next register.

In a second form of stack, the data itself is not moved but the addressing of the data is altered to reflect the position of a particular data element in the stack. Such a system is shown in FIG. 2. A counter 12 is incremented or decremented as data items are pushed into or popped off of the stack. The data items themselves are stored in a memory cell array 14 of RAM 16. The counter produces a multi-bit address code which is decoded by address decoding logic 18 and provided to column drivers 20 and row drivers 22, which are in turn coupled to memory cell array 14. The count of the counter represents the address in RAM 16 of the top of the stack. The circuit of FIG. 2 is easily implemented using standard logic, since the decoding gates are built into the RAM parts. However, when constructing an on-chip stack, area must be paid for to provide the decode logic. In addition, logic is required to increment and decrement the counter and the counter itself takes significant area.

SUMMARY OF THE INVENTION

The present invention is a stack with a unary encoded stack pointer which uses the position of a single bit to point to the top of the stack. A number of multi-bit latches are used to store the data elements in the stack. A serial, bidirectional shift register is loaded with all digital zeros except for a position having a digital one (the pointer) which is coupled to the register containing the top of the stack. As new data elements are pushed onto or popped off of the top of the stack, the pointer is shifted right or left accordingly.

In one embodiment, the output of each position of the shift register is coupled to one input of each of a pair of AND (or NAND) gates, with the outputs of the AND gates being coupled to input (load control) and output (drive control) enable controls for one of the registers of the stack. The other input of each AND gate is connected to a push enable signal or a pop enable signal, respectively. The push enable and pop enable signals are also coupled to rotate left and rotate right control inputs of the bidirectional shift register. On initial loading and reset, a load constant with a single bit being a digital one (the pointer bit) and the remaining bits being digital zeros is loaded into the bidirectional shift register. Thereafter, the pointer bit is shifted right or left as data elements are pushed onto or popped off of the stack.

The present invention thus provides a simplified structure which eliminates the decoding logic necessary for a multi-bit stack pointer of the prior art. In addition, the need to shift all of the bits of the data elements themselves is eliminated. The present invention thus consumes less on-chip area than the prior art.

The invention can be adapted to a FIFO stack by the addition of a separate shift register to act as a pointer for the bottom of the stack. A single digital one pointer bit is also loaded into this shift register, but it controls only the output drive control of each of the stack latches. Similarly, the first stack pointer shift register is coupled only to the data input load control for each of the stack registers. Only the first stack pointer shift register is shifted for a push enable signal, and only the second stack pointer shift register is shifted for a pop enable signal.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a prior art stack which shifts the data elements themselves between registers;

FIG. 2 is a block diagram of a prior art stack using a counter and a RAM;

FIG. 3 is a block diagram of a LIFO stack according to the present invention; and FIG. 4 is a block diagram of a FIFO stack according to the present invention.

DETAILED DESCRIPTION OF THE PREFERRED EMBODIMENT

FIG. 3 shows a LIFO stack according to the present invention. A serial, bidirectional shift register 24 is used to hold the stack pointer, which points to one of a plurality of memory element storage registers 26, 28, 30 and 32. Each of registers 26-32 is coupled to an input bus 34 and an output bus 36 through one of output drivers 38. Each output of stack pointer shift register 24 is coupled to an input load enable of one of memory elements 26-32 through one of AND gates 40. Alternately, NAND gates could be used. Similarly, each output of stack pointer shift register 24 is coupled through one of AND gates 42 to an enable input of an output driver 38.

The other input of each input enable AND gate 40 is coupled to a PUSH enable signal on a line 44. Similarly, the other input of each output enable AND gate 42 is coupled to a POP enable signal on a line 46. PUSH enable line 44 is also coupled to a rotate left input of stack pointer 24, and POP enable line 46 is coupled to a rotate right input of the stack pointer. A reset enable line 48 is coupled to a load input of stack pointer 24, which loads into load input 50 a load constant 1000. A longer load constant would be used for a longer shift register. The load constant could be provided in a variety of ways, such as wiring to the positive voltage (one) and ground (zero) or using a shift register with a programmable reset.

Upon loading of the load constant, the digital one bit (pointer) enables the input of register 26 which receives the first data element for the stack. When a next data element is to be added, PUSH enable line 44 is activated, which rotates the pointer to the left so that register 32 has its input enabled. Similarly, on a subsequent push, the pointer is rotated to enable the input of register 30. For a pop operation, which will remove the top data element of the stack, the POP enable signal is applied to line 46 which enables output driver 38 for register 30 and then is rotated to the right to point to register 32 as containing the new top data element in the stack.

As can be seen from FIG. 3, for a write operation, the input data element is not applied to input bus 34 until after the pointer in stack 24 has rotated, so that it will point to the empty register instead of the top, occupied element of the stack. Similarly, for a read operation, output bus 36 must be read prior to the rotation of the pointer in stack pointer 24 so that the top data element is read, and not the next data element.

A larger stack could be provided by adding more memory element registers and using a wider stack pointer. In addition, instead of using a rotating stack pointer, a simple shifting stack pointer could be used with error detection logic for detecting over- and under-flow of the stack.

FIG. 4 shows a block diagram of a FIFO stack according to the present invention. Two stack pointers 52 and 54 are used, each being a serial shift register. Shift registers 52 and 54 do not need to be bidirectional. Top stack pointer 52 points to the top item of a stack and has its outputs coupled to the load control of each memory element 26-32 through AND gates 40. Bottom stack pointer 54 points to the bottom of each stack, and has its outputs coupled to drive control inputs of drivers 38 through AND gates 42. PUSH enable signal 44' is coupled to the rotate right input of top stack pointer 52 and POP enable signal 46' is coupled to the rotate right input of bottom stack pointer 54.

Upon an initial load, the same load constant is loaded into stack pointers 52 and 54 so that both point to memory element 26. When this element is loaded, it is both the top and the bottom of a stack. As more elements are loaded, stack pointer 52 is rotated to the right with the PUSH enable signal indicating the moving top of the stack. At the same time, bottom stack pointer 54 remains unchanged, since the data element in memory register 26 remains at the bottom of the stack. Upon a POP operation, in which the bottom of the stack is removed, POP enable signal 46' causes bottom stack pointer 54 to rotate to the right as each element is popped off the bottom. At the same time, top stack pointer 52 will remain unchanged since the top of the stack will be unchanged.

As will be understood by those familiar with the art, the present invention may be embodied in other specific forms without departing from the spirit or essential characteristics thereof. For example, the stack pointers of FIG. 4 could rotate to the left, or could simply shift with error detection logic indicating an overflow condition. Accordingly, the disclosure of the embodiment of the invention is intended to be illustrative, but not limiting, of the scope of the invention which is set forth in the following claims.

What is claimed is:

1. A memory stack comprising:
   a plurality of multi-bit storage elements for storing data in fixed positions as a stack;
   I/O bus means coupled to each of said storage elements;
   a plurality of control means for enabling the input and output of data, each being coupled between said I/O bus means and a single one of said storage elements; and
   an unary encoded stack pointer consisting of a serial, bidirectional shift register having a plurality of single bit outputs, each single bit output being coupled to a single one of said control means, such that a value having a single active bit can be shifted in said shift register to point to a one of said storage elements which is a top of said stack.

2. The memory stack of claim 1 wherein said I/O bus means includes
   an input bus coupled to the inputs of said multi-bit storage elements and
   an output bus coupled to the outputs of said multi-bit storage elements, and
   said plurality of control means includes
      first means for enabling a load control of said storage elements responsive to said shift register outputs,
      a plurality of output drivers coupling said storage elements to said output bus, and
      second means for enabling a drive control of said output drivers responsive to said shift register outputs.

3. The memory stack of claim 2 wherein said first and second means for enabling each comprises a series of NAND or AND gates.

4. The memory stack of claim 3 wherein one input of each of said NAND or AND gates is coupled to an output of said shift register and further comprising:
   a push enable line coupled to a second input of said NAND or AND gates for said first means for enabling; and
   a pop enable line coupled to a second input of each NAND or AND gate of said second means for enabling.

5. The memory stack of claim 1 further comprising means for loading a constant into said shift register, said constant being a digital number with a single digital one.

6. The memory stack of claim 1 wherein said first-mentioned serial shift register has each output coupled to a load control input of one of said multi-bit storage elements, and further comprising a second serial shift register having a plurality of single bit outputs, each single bit output of said second shift register being coupled to a driver control for an output of one of said multi-bit storage elements.

7. A memory stack comprising:
   a plurality of multi-bit storage elements; and
   a serial shift register having a plurality of single bit outputs;
   an input bus coupled to the inputs of said multi-bit storage elements;
   an output bus coupled to the outputs of said multi-bit storage elements;
   first means for enabling a load control of said storage elements including a series of NAND or AND gates, one input of each NAND or AND gate being coupled to one of said shift register outputs;
   a plurality of output drivers coupling said storage elements to said output bus;
   second means for enabling a drive control of said output drivers including a series of AND gates, one input of each NAND or AND or NAND gate being coupled to one of said shift register outputs;
   a push enable line coupled to a second input of said NAND or AND gates for said first means for enabling;
   a pop enable line coupled to a second input of each NAND or AND gate of said second means for enabling; and
   means for loading a constant into said shift register, said constant being a digital number with a single digital one.

* * * * *